INVENTORS
WILLIAN L. DUDA
KURT M. KOSANKE
WERNER W. KULCKE
ERHARD MAX

ATTORNEYS

United States Patent Office 3,554,634
Patented Jan. 12, 1971

3,554,634
OPTICAL LOGIC DEVICE FOR POSITION-ENCODING A LIGHT BEAM
William L. Duda and Kurt M. Kosanke, Wappingers Falls, Werner W. Kulcke, Poughkeepsie, and Erhard Max, Wappingers Falls, N.Y., assignors to International Business Machines Corporation, Armonk, N.Y., a corporation of New York
Filed Dec. 23, 1965, Ser. No. 515,843
Int. Cl. G02f 7/00
U.S. Cl. 350—160        10 Claims

ABSTRACT OF THE DISCLOSURE

A light beam is digitally deflected to selected ones of a plurality of discrete positions in accordance with a logical function which controls the operation of the beam deflecting means. Optical encoding means uniquely encode a characteristic of the beam for each discrete position. When the light beam is polychromatic, the light beam is passed through a different combination of filters at each discrete position so that the beam contains a unique combination of wavelengths at each position. When the light beam is monochromatic, the beam may be split into a unique combination of paths for each discrete position and then intensity-encoded by masks in the paths. A monochromatic beam may also be directed to a processed Lippmann film which will reflect the beam at unique combinations of Bragg angles corresponding to each discrete position.

This invention relates generally to an improved device for performing optical logic and, more particularly, to such a device utilizing an optical light deflector and a light encoding means to provide an optical output indicative of the result of an input logical function.

An electro-optical digital light deflector is described in a copending patent application Ser. No. 285,832 (IBM Docket 7662) filed June 5, 1963, Pat. No. 3,499,700, and assigned to the same assignee as the present invention. This deflector has $n$ input switches which permit a light beam to be directed to any one of $2^n$ discrete output positions. The principle of operation of such a light deflector is based on the difference in optical paths of the ordinary and extraordinary ray through birefringent crystals of light beams of mutually perpendicular linear polarization directions.

In the present invention, such a deflector is incorporated in an optical logic device having means for optically encoding the beam in accordance with the output positions, thereby permitting convenient optical or electro-optical read-out of the beam position. If binary input signals are applied to the $n$ inputs of the deflector in accordance with a logical input function, then the result or solution of the function is indicated by the output position of the light beam.

However, there is some difficulty connected with reading out the result because of the large number of closely spaced output positions in the output plane. One means of reading out the individual results or solutions is to provide $2^n$ light detectors and place one opposite each of the output positions to detect the light beam when it is deflected to that position. However, such a read-out means is undesirable since, where $n$ is large, a large number of light detectors is required. The positions of the deflected light beam may also be read-out by scanning the plane of the output beam positions with a suitable scanner. However, such a scanning operation is undesirable because it requires too much time.

Therefore, the principal object of this invention is to provide an improved optical logic device and read-out means therefor.

Another object of the invention is to provide an electro-optical logic device which both deflects a light beam and encodes a characteristic thereof in accordance with a logical function applied to the input of the device, thereby providing an optical output which may be conveniently read-out to provide an indication of the result or solution of the logical input function.

Another object is to provide an electro-optical logic device which digitally deflects a light beam to output positions respectively indicative of the results of logical input functions applied to the device and which simultaneously encodes a characteristic of the light beam to provide an optical output which may be conveniently read-out to determine the result.

A more specific object of the invention is to provide an electro-optical logic device which simultaneously positions a light beam in accordance with the result of input logical functions and encodes the frequency components of the light beam in accordance with the output positions of the beam.

Another specific object of the invention is to provide an electro-optical logic device which both deflects a light beam to output positions indicative of the results of logical input functions and also simultaneously encodes the intensity pattern of the light beam in accordance with the output positions of the beam.

Still another specific object is to provide an electro-optical logic device which both deflects a light beam to output positions indicative of the results of logic input functions and reflects the positioned beams from a coded Lippmann film to permit Bragg angle read-out of the results.

In accordance with a preferred embodiment of the invention, there is provided a digital electro-optical light beam deflector which deflects a linearly polarized white light beam to an output position which is indicative of the result of the logical input function. If the deflector has $n$ inputs, there are $2^n$ possible output positions. The beam is optically encoded to correspond to each output position by providing in the path of the deflected beam $n$ interference filters each of which is opaque to a different one of $n$ separable wavelengths of the white light. These filters are then oriented with respect to each other so that $2^n$ combinations of the $n$ wavelengths appear at the output of the filters. Each unique combination corresponds to a different one of the $2^n$ output positions and, consequently, the result of the logical input function may be read-out by suitable frequency sensitive light detectors.

In another embodiment of the invention, the light beam is monochromatic and the optical logic device includes means for splitting each deflected light beam into $n$ optical paths. Placed in each path is an optical mask having a pattern of transparent and opaque areas unique to that path. The point on each optical mask at which a split light beam strikes the mask is determined by the deflected output position of the beam. Conquently, the $n$ split beams are intensity encoded in accordance with the deflected output position. The $2^n$ output positions may easily be read-out by means of $n$ properly oriented light detectors to provide an indication of the result of a logical input function controlling the deflection of the light beam in the electro-optic logical device.

In still another embodiment employing monochromatic light, the deflected beam is focused on a Lippmann film whose layers of standing wave patterns are coded so that each position on the film reflects only the component rays of the beam which are incident on the film at a unique combination of $n$ Bragg angles determined by the coded layers of the film at that position. Furthermore, $n$ light detectors are properly spaced to decode the reflected light rays by means of Bragg angle read-out.

The foregoing and other objects, features and advantages of the invention will be apparent from the following more particular description of preferred embodiments of the invention as illustrated in the accompanying drawings.

Figure 1:
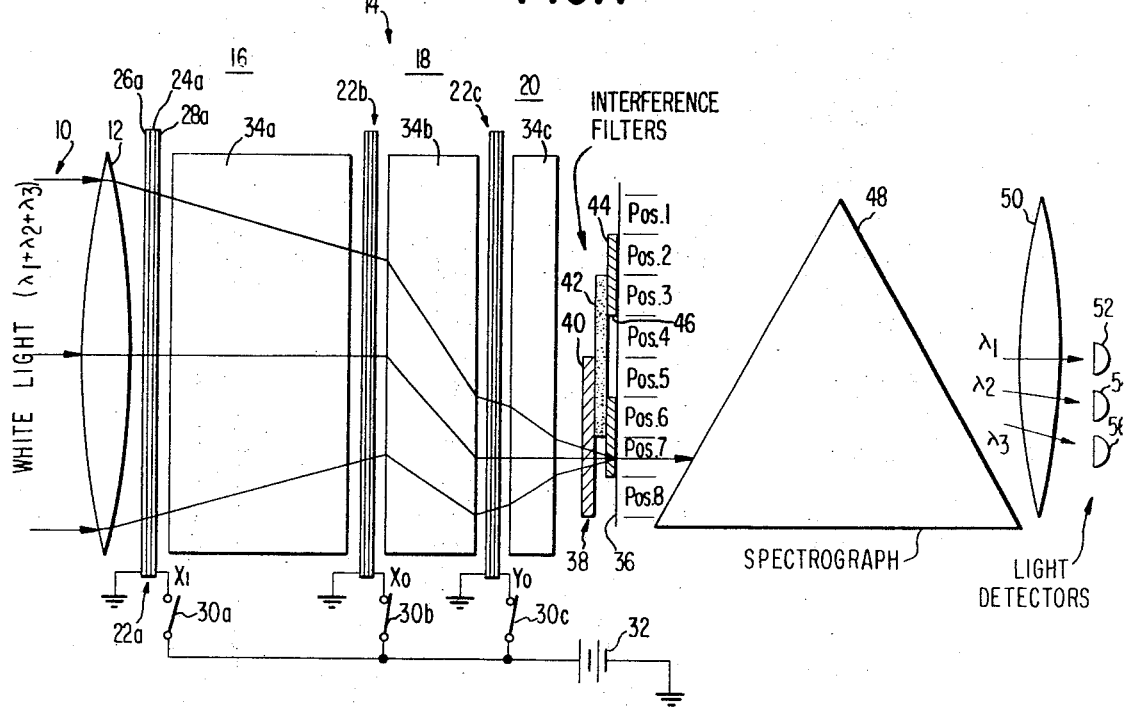
FIG. 1 is a schematic diagram of a preferred embodiment of the invention employing frequency or wavelength encoding.

In the preferred embodiment of an improved optical logic device illustrated in FIG. 1, $n$ equals 3. A linearly polarized collimated white light beam 10 is directed by a converging lens 12 through a digital electro-optic deflector generally designated by the reference numeral 14. Deflector 14 is disclosed and claimed in detail in the pending patent application cited above. However, it will be helpful in the understanding of the present invention to summarize the structure and operation of the deflector as it applies to this invention.

Deflector 14 includes three stages, 16, 18 and 20. Each stage includes similar elements which are designated by the same reference number with subscripts $a$, $b$ or $c$ to distinguish the stages. Stage 16, for example, comprises an electro-optical linear polarization direction rotator 22a which includes an electro-optically active crystal 24a having transparent electrodes 26a and 28a on the opposite faces thereof. One electrode is grounded and the other is connected through a switch 30a to a source of predetermined voltage, such as a battery 32. When switch 30 is closed to apply the voltage to electro-optic rotator 22a, the direction of linear polarization is rotated by 90°. When switch 30a is open so that no voltage is applied to the electro-optic crystal, then no rotation of the polarization direction occurs.

Each stage also includes a birefringent crystal, such a crystal 34a in stage 16, crystal 34b in stage 18, and crystal 34c in stage 20. For one direction of polarization, the light passes through the birefringent crystal as an ordinary ray without deflection since its optical path is not altered by the crystal. However, for the other direction of linear polarization, the beam follows the path of the extraordinary ray and is deflected an amount determined by the refractive index and the thickness of the crystal and the plane of incidence of the beam. In deflector 14, the thicknesses of the birefringent crystals form a ratio of 4:2:1 in the direction of propagation of the light beam. Such an arrangement permits the beam to be deflected to $2^n = 8$ discrete vertical output positions or levels for $n=3$ stages, because each combination of closed and opened switches 30a, 30b and 30c will deflect the beam to a different discrete output position in the output plane 36.

Let us now assume that the white light beam contains $n=3$ easily separable wavelengths λ1, λ2 and λ3. Placed in the path of the beams emanating from deflector 14 is a frequency or wavelength encoding device 38 in the form of three interference filters 40, 42 and 44. Filter 40 is opaque to λ1, filter 42 is opaque to λ2, and filter 44 is opaque to λ3. Each filter is transparent to all other light wavelengths or frequencies contained in the light beam. Furthermore, filter 44 has a gap 46 in the center thereof. The filters are vertically arranged so that for the $2^n = 8$ vertical positions of the light beam in output plane 36, there are eight combinations of the $n=3$ filters through which the beam may pass. Each combination represents a different binary number. These eight positions or levels are indicated as "pos. 1 ... pos. 8." The combination of the three wavelengths for each position is shown in the following table:

| Pos. | 1 | 2 | 3 | 4 | 5 | 6 | 7 | 8 |
|---|---|---|---|---|---|---|---|---|
| | λ1λ2λ3 | λ1λ2$\bar{λ3}$ | λ1$\bar{λ2}$λ3 | λ1$\bar{λ2}\bar{λ3}$ | $\bar{λ1}$λ2λ3 | $\bar{λ1}$λ2$\bar{λ3}$ | $\bar{λ1}\bar{λ2}$λ3 | $\bar{λ1}\bar{λ2}\bar{λ3}$ |

Consequently, the light beam focused on output plane 36 contains a different unique combination of the three wavelengths for each of the eight output positions of the light beam. Suitable frequency sensitive light detecting means may be used to decode each combination, thereby reading out the result or solution of the logical input function or combination of switches 30a, 30b and 30c which were closed. It should be pointed out at this time that the switches 30 are shown only to illustrate the operation of the invention. In practice, the function of these switches will be provided by suitable electronic circuits which would apply binary voltage signals to the rotators 22a, b and c. Switch 30a is also designated as the $x_1$ input to stage 16, the switch 30b as the $x_0$ input to stage 18 and the switch 30c as the $y_0$ input to stage 20. These inputs represent logical functions and for the specific case shown, a two bit input for an $x$ word and a one bit input for a $y$ word. Therefore if binary signals representing logical functions are applied to the inputs $x_1$, $x_0$ and $y_0$, the position and frequency encoding of the light beam will be indicative of the results or solutions of the logical functions. In the example illustrated in FIG. 1, the beam has been deflected to position 7 and is frequency encoded as $\bar{λ1}$, λ2, $\bar{λ3}$ which represents the binary number 010.

An example of the manner in which the frequency encoding may be read-out is also illustrated in FIG. 1. The output beams are directed to a spectrograph 48, schematically illustrated as a prism, which functions to separate the three wavelengths λ1, λ2 and λ3. The output of spectrograph 48 is passed through a lens system 50 which focuses each of the three wavelengths on a different one of three corresponding light detectors 52, 54 and 56. As shown λ1 is focused on detector 52, λ2 on detector 54, and λ3 on detector 56. These detectors may be either optical for optical read-out or electro-optical for electrical read-out. Spectrograph 48, lens system 50 and light detectors 52, 54 and 56 form a frequency or wavelength sensitive read-out means for the optical logic device including deflector 14 and encoding means 38.

Figure 2:
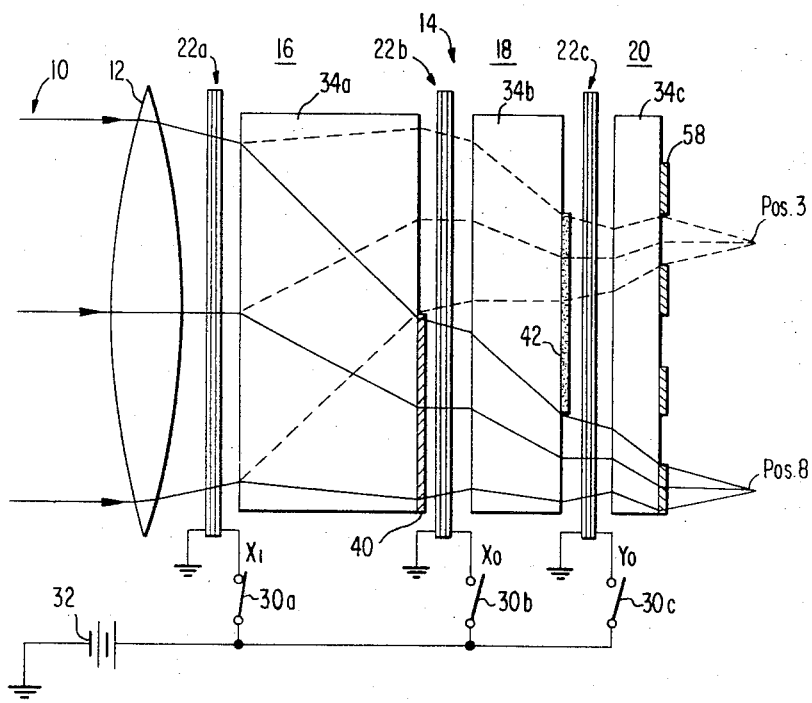
FIG. 2 is a schematic diagram of a modification of the embodiment of FIG. 1.

In FIG. 2 there is illustrated a modification of the embodiment of FIG. 1. Here the three interference filters forming the frequency encoding means are separated and each is physically associated with a different stage of the deflector 14. The same reference numerals have been used in FIG. 2 to designate parts corresponding to the embodiment of FIG. 1. Filters 40 and 42 are identical to those shown in FIG. 1. However, filter 44 of FIG. 1 is replaced by a filter 58 having the same spectral response but having four gaps therein corresponding to the even numbered output positions of the deflector. In FIG. 2, filter 40 is opaque to λ1, filter 42 to λ2 and filter 58 to λ3. Only switch 30a is shown closed so that the light beam is deflected to position 8. The path of the beam through deflector 14 is shown in full lines. The beam path for a deflection to position 3 is shown in dashed lines.

The binary numbers, i.e., combinations of the λ1, $\lambda 2$ and $\lambda 3$ for the eight positions are shown as combinations of the three wavelengths in the following table:

| Pos. | 1 | 2 | 3 | 4 | 5 | 6 | 7 | 8 |
| --- | --- | --- | --- | --- | --- | --- | --- | --- |
| | $\lambda 1 \lambda 2 \lambda 3$ | $\lambda 1 \lambda 2 \bar{\lambda}3$ | $\lambda 1 \bar{\lambda}2 \lambda 3$ | $\lambda 1 \bar{\lambda}2 \bar{\lambda}3$ | $\bar{\lambda}1 \lambda 2 \lambda 3$ | $\bar{\lambda}1 \bar{\lambda}2 \lambda 3$ | $\bar{\lambda}1 \lambda 2 \bar{\lambda}3$ | $\bar{\lambda}1 \lambda 2 \bar{\lambda}3$ |

Vacuum deposition techniques permit the discrete interference filters to be produced in minute patterns. However, continuous Verlauf type interference filters can also be employed. Other filters useful for encoding the output position of the beam are Lyot filters, which make use of interference in birefringent crystals, and those which make use of the optical activity of the crystals. In another especially effective approach, Lippmann film standing wave patterns may be associated with the discrete output positions in the output plane (FIG. 1). Such patterns offer the advantage of extremely small band color selection.

Figure 3:
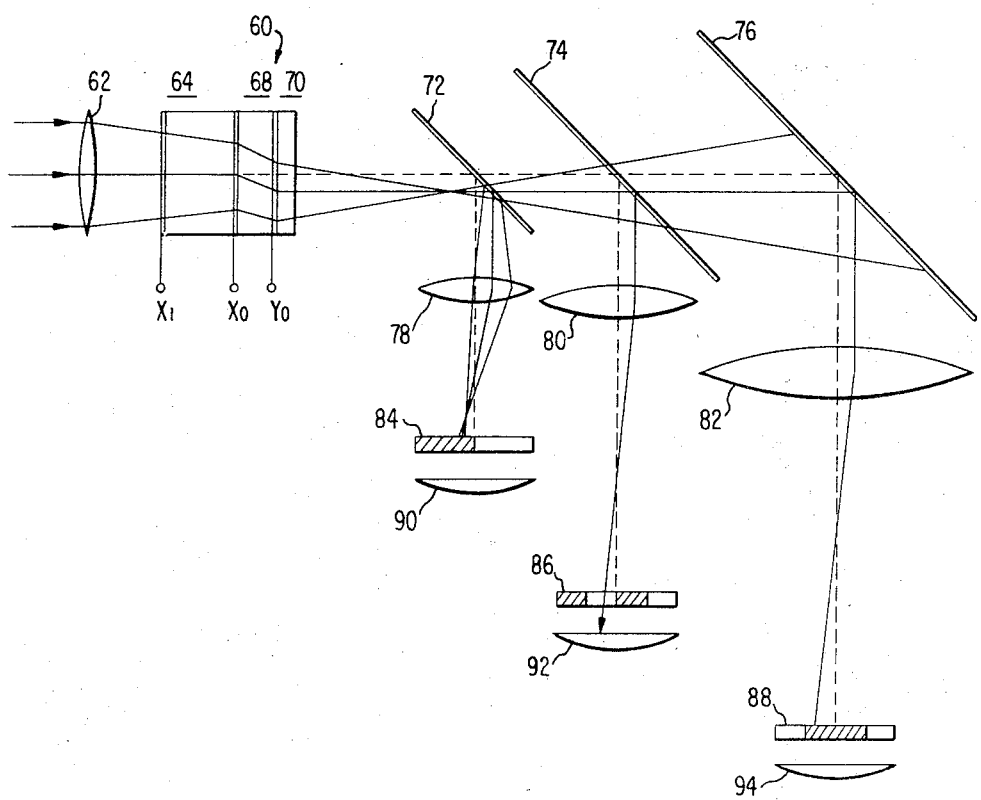
FIG. 3 is a schematic diagram of another embodiment of the invention employing intensity encoding.

Still another embodiment of the invention is illustrated in FIG. 3. However, in this embodiment either monochromatic or while light may be used since the light beam is intensity encoded rather than frequency or wavelength encoded. As in the previous two embodiments, a suitable digital electro-optic light deflector 60 receives a convergent light beam from a lens 62 and the beam is deflected within the crystal to one of $2^n = 8$ output positions. In this embodiment the thickness of birefrigent crystals of three stages 64, 68 and 70 bear a ratio of 4:2:1 with respect to each other. The output beam is directed to three horizontally aligned beam splitters 72, 74 and 76, each of which reflects part of the beam through a corresponding lens system 78, 80 or 82 to a corresponding optical mask 84, 86 or 88. As illustrated, these masks are encoded with optical patterns in the form of opaque and transparent areas, the black areas being opaque and the white areas being transparent. Opposite each of the masks is a corresponding light detector 90, 92 or 94. When light passes through a mask to a detector, a binary "one" is indicated, and when no light falls upon a detector, a binary "zero" is indicated.

For each of the eight output positions of the light beam, the beam splitters and lens systems function to direct the three split beams upon the masks so that eight different binary numbers are sensed by the detectors, each number corresponding to a different one of the eight positions. Consequently, in the FIG. 3 embodiment, the result of a logical function is read-out by intensity encoding the light beam output positions by means of the beam splitters 72, 74 and 76, lens systems 78, 80 and 82, the masks 84, 86 and 88, and the light detectors 90, 92 and 94.

Figure 4:
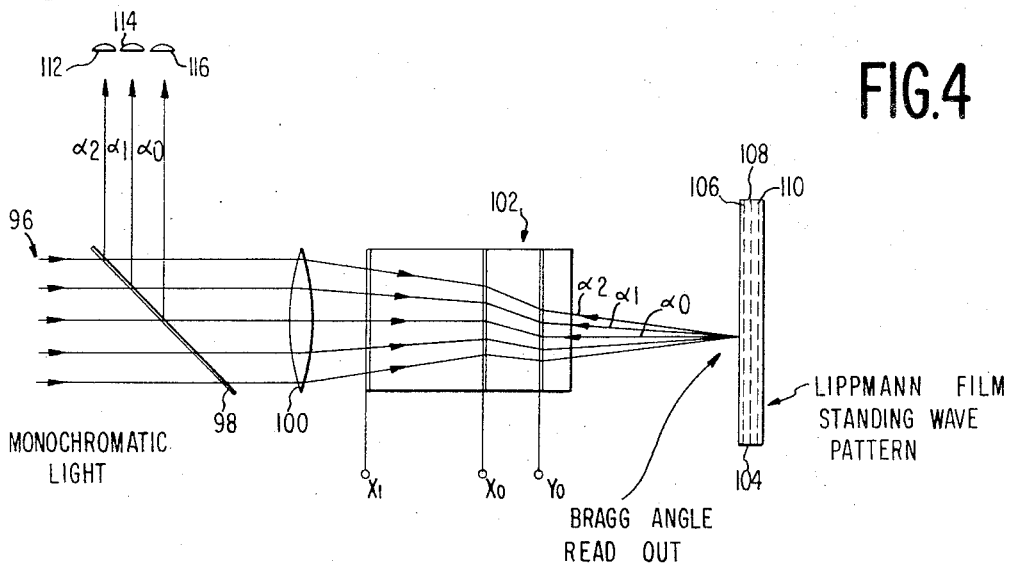
FIG. 4 is a schematic diagram of still another embodiment of the invention employing Brag angle read-out.

In FIG. 4 there is shown another embodiment of the invention employing Bragg angle read-out utilizing a Lippmann film standing wave pattern. Such an arrangement relies upon the fact that monochromatic light is strongly reflected by a Lippmann film only in the Bragg angle directions corresponding to the wave patterns associated with each of the output positions. Light sensing means may then be arranged to detect light beams reflected at different combinations of Bragg angles.

More specifically, there is diagrammatically illustrated in FIG. 4 an electro-optic logic device utilizing this principle. A monochromatic light beam 96 passes through a beam splitter 98 and a converging lens 100 to an electro-optic light deflector 102 identical to the deflector 64 of FIG. 3. Agains, $n = 3$ stages or inputs and $2^n = 8$ output positions. The output beam is focused upon a Lippmann film 104 which has been processed to contain $n = 3$ encoded laminae 106, 108 and 110 of reflecting material produced by the action of standing waves of light on the originally photographically sensitive emulsion in the Lippmann film. Lippmann films per se are known and are described in a copending U.S. patent application Ser. No. 332,755, filed Dec. 23, 1963, and assigned to the assignee of the present invention.

The encoding of the laminate in the Lippmann film is such that for each of the eight discrete output positions, there will be reflected only light rays incident at the Bragg angle or angles corresponding to the position. As illustrated, light beam 96 has $n = 3$ component rays which are incident upon the Lippmann film laminae at the three Bragg angles $\alpha_1$, $\alpha_2$ and $\alpha_3$. The film has been previously processed so that the laminae are encoded in the $2^n = 8$ discrete output positions so that each position of the film reflects light at different combinations of the three Bragg angles. Each light ray deflected at a Bragg angle travels back through deflector 102 along its original path where it is reflected by beam splitter 98 toward a corresponding one of three spaced light detectors 112, 114 and 116, each of which is arranged to detect light reflected at a different one of the angles $\alpha_1$, $\alpha_2$ and $\alpha_3$. As with the previous embodiments, the combination of light detectors which receive reflected light for each discrete output position determines the binary number of the position.

It is also contemplated that two or more of the described encoding methods i.e. frequency, intensity and Bragg angle encoding can be employed simultaneously in a single optical logic device to permit the performance of several logical functions with the same device.

While the invention has been particularly shown and described with reference to preferred embodiments thereof, it will be understood by those skilled in the art that various changes in form and details may be made therein without departing from the spirit and scope of the invention.

What is claimed is:

1. An optical logical device comprising in combination
   (a) means for selectively positioning a single light beam at a plurality of discrete positions, and
   (b) means in the path of the positioned beam for uniquely encoding a plurality of different values of a characteristic of the positioned beam in accordance with each discrete position of the beam.

2. An optical device as defined in claim 1 further comprising means for detecting the encoded light beam.

3. An optical logic device as defined in claim 1 wherein said light beam contains plural wavelengths of light and said encoding means comprises wavelength responsive means for assigning a unique combination of wavelengths to said beam for each discrete position.

4. An optical logic device as defined in claim 3 wherein said wavelength responsive means is a plurality of light filters, each filter being opaque to one of said wavelengths and being transparent to the other of said wavelengths.

5. An optical logic device as defined in claim 4 further comprising light wavelength responsive means for detecting the encoded light beam.

6. An optical logic device as defined in claim 1 wherein said encoding means comprises
   (a) means for splitting the positioned light beam into a plurality of paths, and
   (b) a uniquely coded optical mask in each of said paths.

7. An optical logic device as defined in claim 1 wherein
   (a) said encoding means comprises a Lippmann film in the paths of the discrete position of the light beam, said film containing a plurality of processed reflecting laminae which are encoded to reflect light rays from each of said discrete positions at a unique combination of Bragg angles, and (b) further comprising light detector means arranged to decode the reflected light rays.

8. An optical logic device as defined in claim 1 wherein said positioning means comprises
(a) a plurality of electro-optic light deflection stages each deflecting the light beam a predetermined amount when subjected to a predetermined electric field, and
(b) circuit means for applying said predetermined electric field to said stages in accordance with a logical function so that both the position and the encoded optical characteristic of said light beam are indicative of the result of said logical function.

9. An optical logic device as defined in claim 8 wherein said light beam is linearly polarized and each of said stages comprises
(a) an electro-optic crystal connected to said circuit means for transmitting said light beam in one of two possible polarization directions oriented at ninety degrees with respect to each other, and
(b) a birefringent crystal which deflects the polarized light beam in accordance with the direction of polarization.

10. An optical logic device as defined in claim 9 wherein said beam contains plural wavelengths of light, and said encoding means comprises a plurality of light filters, each opaque to a different one of said wavelengths, and each filter being disposed adjacent a different one of said stages.

References Cited
UNITED STATES PATENTS

| | | | |
|---|---|---|---|
| 3,316,501 | 4/1967 | Collins et al. | 331—94.5 |
| 3,256,443 | 6/1966 | Moore | 331—94.5 |

WILLIAM L. SIKES, Primary Examiner

U.S. Cl. X.R.

350—168